United States Patent [19]

Leshem et al.

[11] 4,018,346
[45] Apr. 19, 1977

[54] MOUNTING ARRANGEMENT FOR ANCHOR FINGERS ON A SURFACE TRAVERSING APPARATUS

[75] Inventors: Adam Leshem, West Hartford; Martin Lewis Marugg, Enfield, both of Conn.; Dennis Edward Savor, Chattanooga, Tenn.

[73] Assignee: Combustion Engineering, Inc., Windsor, Conn.

[22] Filed: Nov. 18, 1975

[21] Appl. No.: 633,065

[52] U.S. Cl. .............................. 214/1 BB; 165/76; 214/1 CM
[51] Int. Cl.² ....................................... F28G 15/08
[58] Field of Search ......... 165/76; 214/1 BB, 1 CM

[56] References Cited

UNITED STATES PATENTS

| | | | |
|---|---|---|---|
| 3,913,752 | 10/1975 | Ward | 214/1 BB |
| 3,934,731 | 1/1976 | Muller | 214/1 BB |

Primary Examiner—Robert J. Spar
Assistant Examiner—George F. Abraham
Attorney, Agent, or Firm—Stephen L. Borst; Eldon H. Luther

[57] ABSTRACT

An improved surface traversing apparatus has an anchor finger selectively movable laterally of another anchor finger into near or substantial alignment with an opening in a member for insertion thereinto and includes one or more of the fingers being mounted to a base portion of the platform by a mounting arrangement which allows one finger to be deflected laterally relative to another finger such that the finger being inserted may deflect into exact alignment with the receiving opening by lateral engagement with the sidewall of the opening. Each finger is resiliently mounted to a connecting member which is, in turn, connected to the base portion of the platform. The resilient mount for each finger normally centers the finger and allows both pivotal and translatory displacement of the finger relative to the connecting member. A cylindrical adaptor is fixed to the finger and is radially supported in a circular opening in the connecting member by a resilient O-ring therebetween in mutually opposing radial engagement therewith.

13 Claims, 10 Drawing Figures

FIG.1
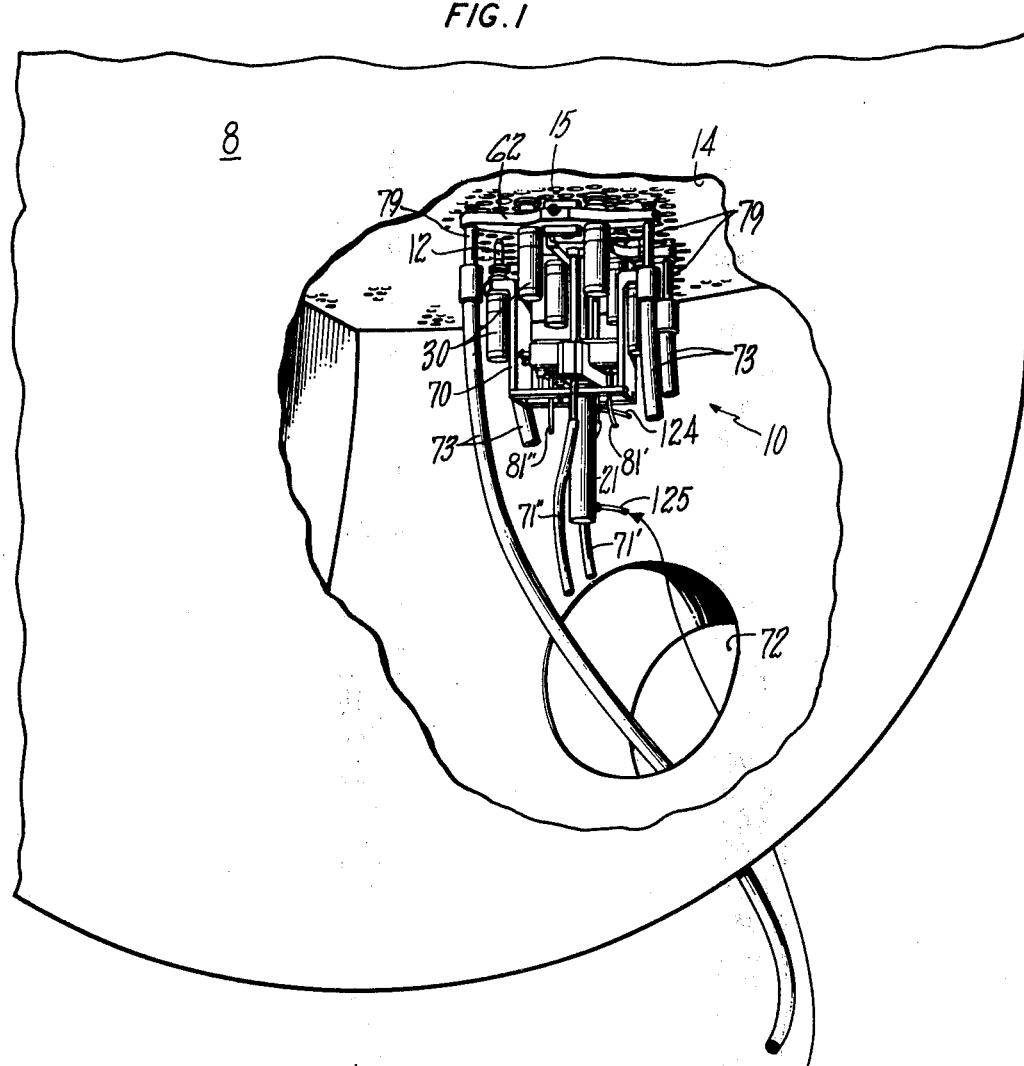
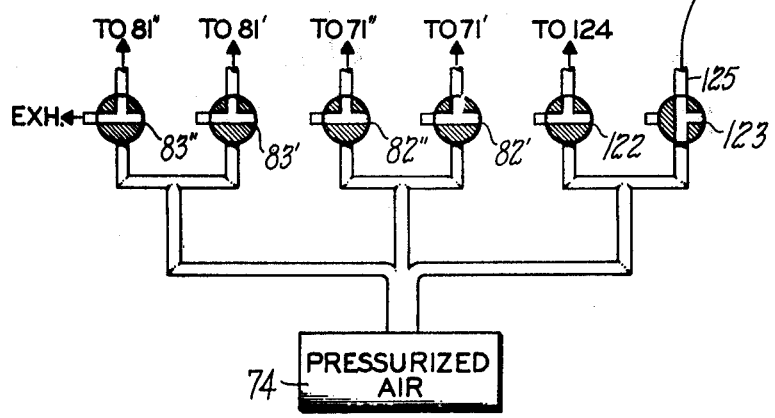

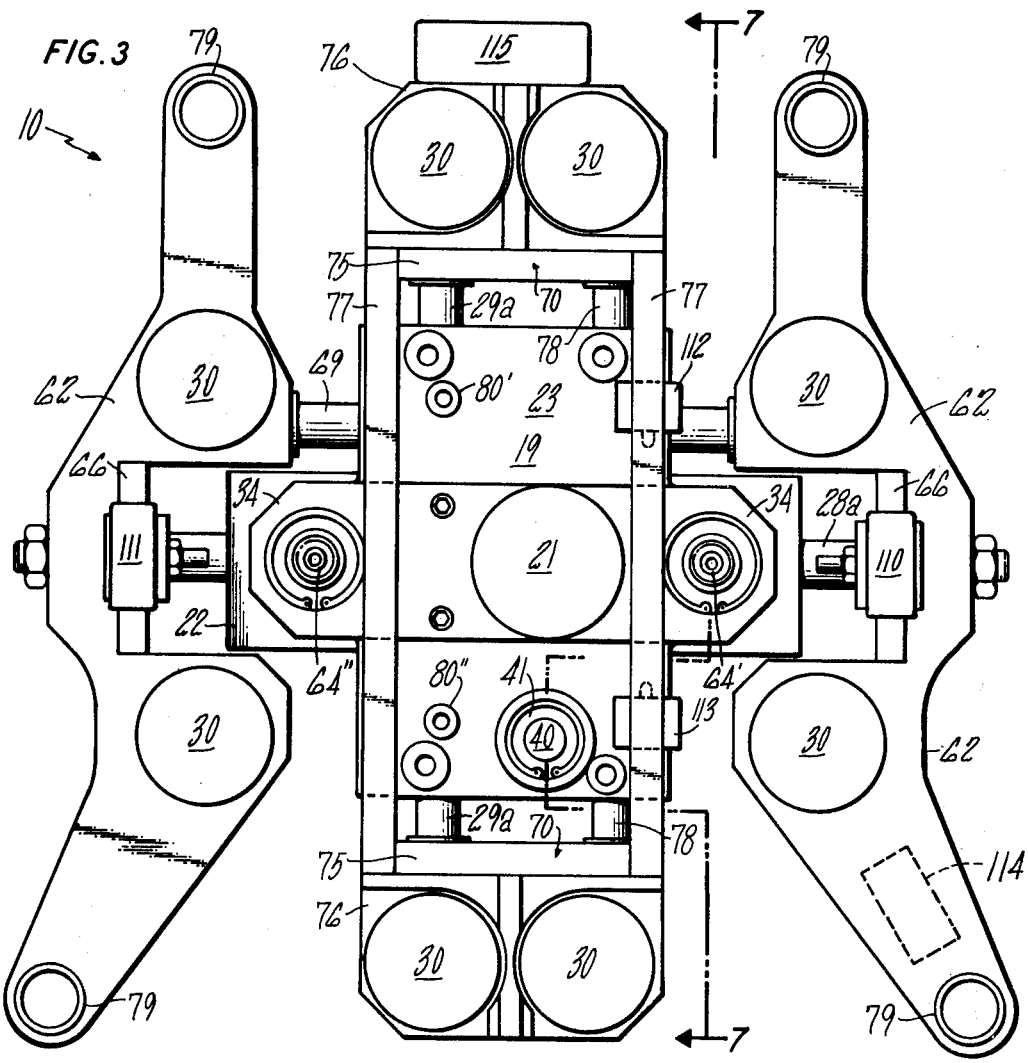
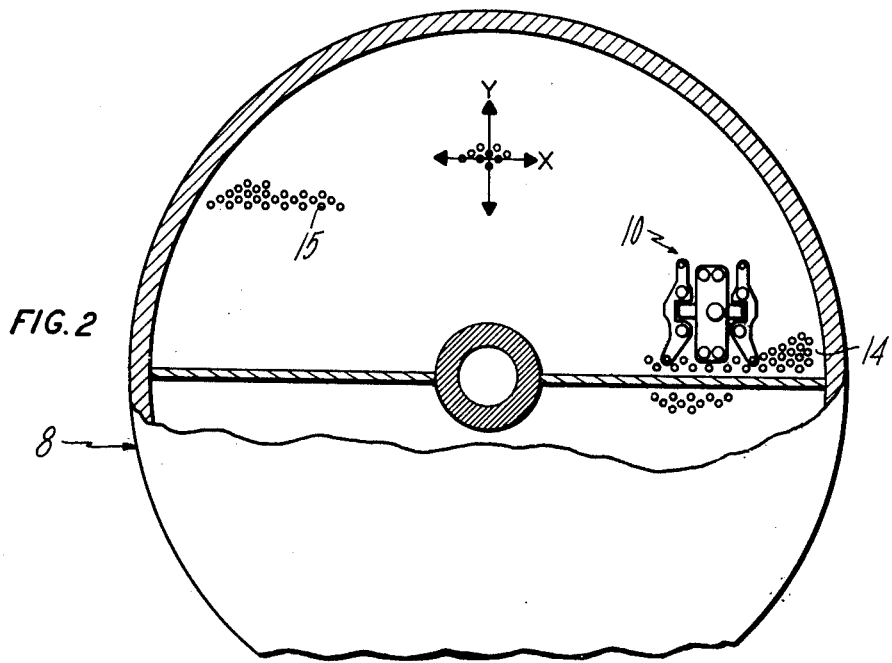

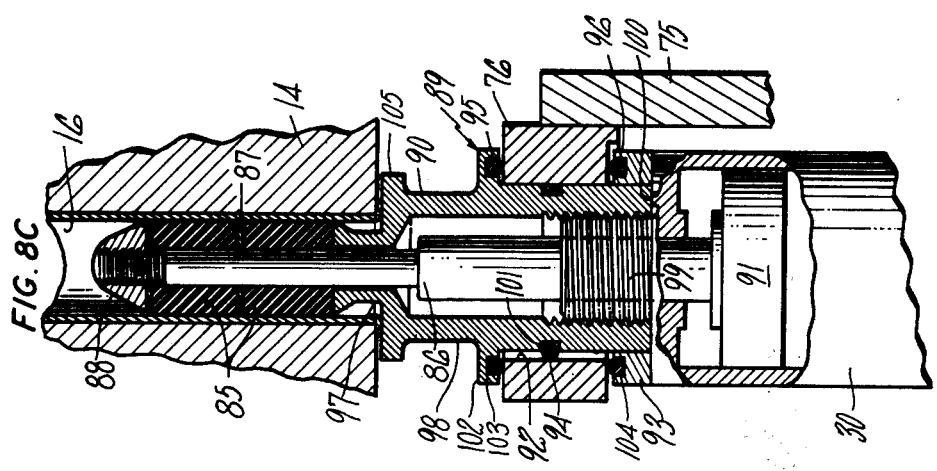
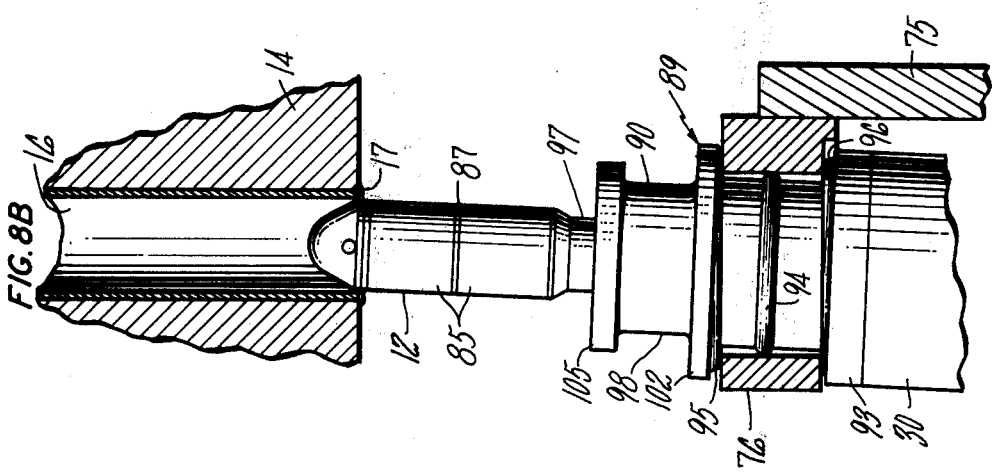
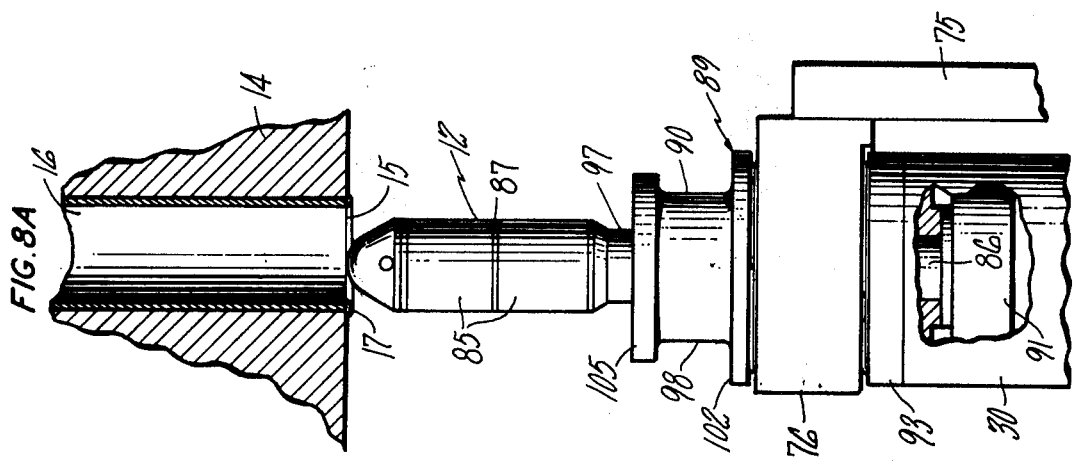

MOUNTING ARRANGEMENT FOR ANCHOR FINGERS ON A SURFACE TRAVERSING APPARATUS

BRIEF SUMMARY OF THE INVENTION

The invention relates generally to surface traversing apparatus and more particularly to surface traversing apparatus having stepable fingers for traversing a member having openings therein. More particularly still, the invention relates to surface traversing apparatus having new and improved means for mounting the fingers thereon.

U.S. Pat. No. 3,913,752 issued Oct. 21, 1975 to Ward et al for "Remotely Movable Platform" describes a remotely operable carriage or platform suited for traversing the surface of a member, as for instance a tube sheet in a nuclear steam generator. Two groups of anchor fingers are selectively movable laterally, or tranversely, relative to one another by connection with a selectively actuable stepping mechanism connected in turn to a base portion of the platform. The anchor fingers are longitudinally movable toward and away from the member for selective insertion into and withdrawal from the openings in the member. By selectively controlling the insertion, the withdrawal and the lateral or transverse stepping of the anchor finger groups, the platform may be stepped or "walked" across the member. Further, the anchor fingers may be selectively expanded into gripping engagement with the member when inserted into the member openings thereby to support the platform near or adjacent to the member.

The ability of the platform to "walk" and to support itself depends on the fingers being inserted in the member openings which, in turn, may depend largely on exact alignment of a finger with an opening just prior to insertion, particularly where the normal or contracted diameter of each finger prior is not substantially less than the diameter of the receiving opening and the finger is mounted to extend from the stepping mechanism in fixed lateral relationship therewith, as in the aforementioned application. However, where the geometry and positioning of the openings may vary, as due to eccentricities introduced by weld beads on the mouths of the tubes defining the openings in the tube sheet, and accumulated spacing tolerances between several tubes, and, further, where the length and direction of the step taken by a finger may vary slightly from step to step due to tolerances and stresses in the platform mechanism, a finger might be in near, but not exact, alignment with a member opening following a stepping movement. Such near alignment of finger and opening may allow only the top of the finger to enter the opening while preventing further entry or full insertion of the finger. This makes it difficult to insure that full insertion of the fingers will occur following every stepping movement, and, in any event, may result in undesirable wear between the finger and tube.

Accordingly, it is a primary object of this invention to provide a new and improved surface traversing apparatus of the type having an anchor finger movable stepwise transversely of another anchor finger into near alignment with an opening in a member for selective insertion into the member opening wherein the dependence of the finger on exact alignment with the opening for its insertion thereinto is reduced. Included in this object is the provision of an improved finger mounting arrangement which allows lateral deflection of one finger relative to another finger. Further included in this object is the provision of a finger mounting arrangement which permits a finger positioned in near or substantial alignment with an opening to be deflected laterally into exact alignment with the opening by its lateral engagement with the sidewall of the opening during insertion.

It is another object of the invention to provide in surface traversing apparatus of the type described, a new and improved finger mounting arrangement for normally supporting a finger in a predetermined position while permitting transverse displacement of the finger from the predetermined position by a laterally directed force applied thereto.

According to the invention, a new and improved surface traversing apparatus or platform comprising an anchor finger selectively movable laterally of another anchor finger into near or substantial alignment with an opening in a member for insertion thereinto includes one or more of the fingers being mounted or connected to a base portion of the platform in a manner which allows one finger to be laterally deflectable relative to another finger such that the finger being inserted may deflect into exact alignment with the receiving opening by lateral engagement with the sidewall of the opening. Preferably, each finger is resiliently mounted to a connecting member which is, in turn, connected to the base portion of the platform. The resilient mount for each finger normally centers the finger and allows both pivotal and translatory displacement of the finger relative to the connecting member.

Other objects will be in part obvious and in part pointed out more in detail hereinafter.

A better understanding of the invention will be obtained from the following detailed description and the accompanying drawings of an illustrative application of the invention.

BRIEF DECRIPTION OF THE DRAWINGS

In the drawings:

FIG. 1 is a perspective view of a surface traversing apparatus incorporating the improvements of the invention operatively positioned in a nuclear steam generator;

FIG. 2 is a diagrammatical bottom view of the surface traversing apparatus operatively positioned on the undersurface of a tube sheet in a nuclear steam generator;

FIG. 3 is a bottom view of the surface traversing apparatus with the air and probe hoses removed for clarity;

Figure 7:
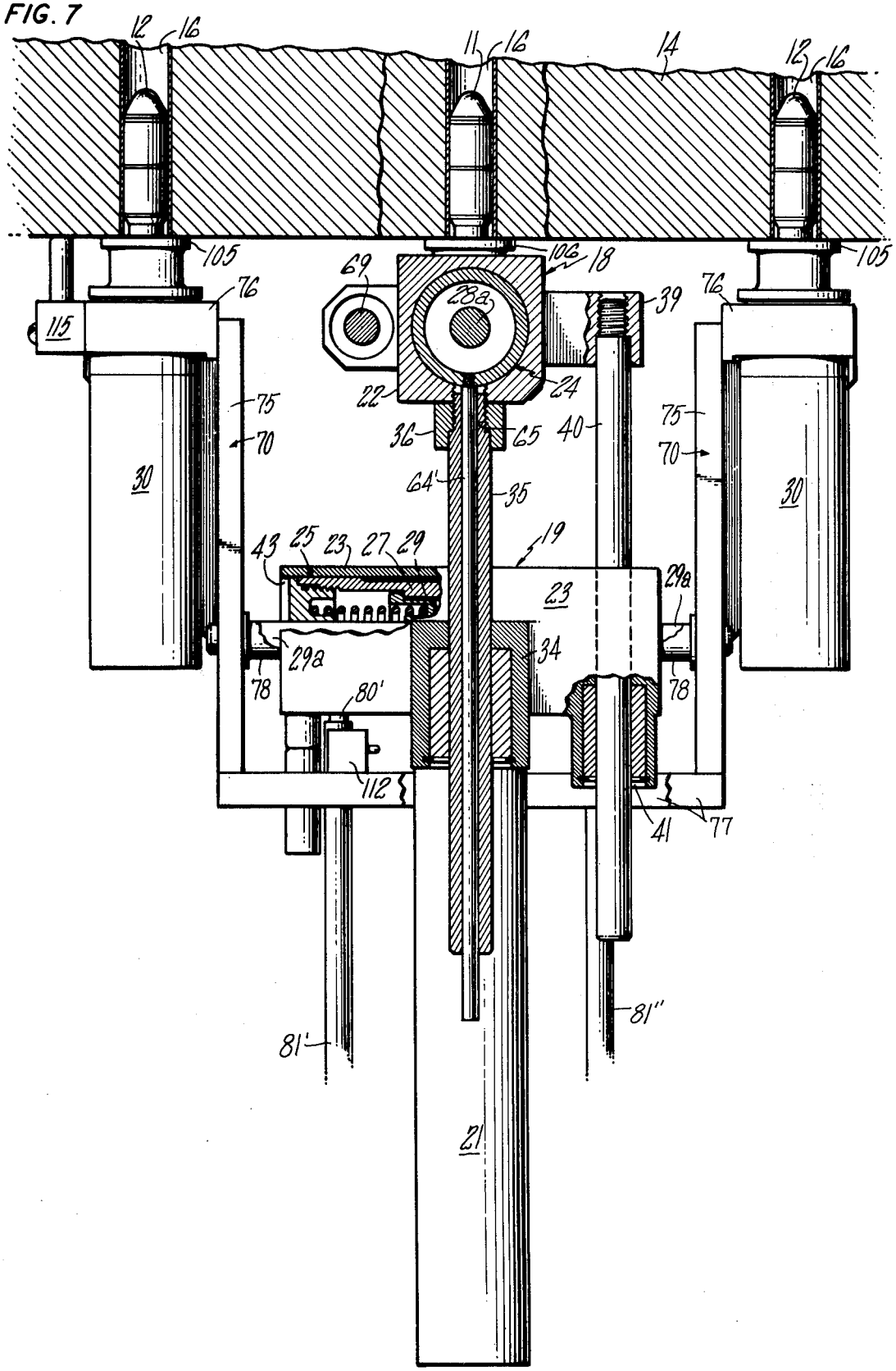

FIG. 7 is a sectional view of the surface traversing apparatus, with portions broken away, taken substantially along line 7—7 in FIG. 3 and showing the fingers inserted in tubes in the steam generator tube sheet; and FIGS. 8A, 8B and 8C are enlarged elevation views, partly broken away and partly in section, showing a finger in a normal reference position on the surface traversing apparatus and in limited misalignment with the opening of a tube prior to its insertion thereinto, showing the finger entering the tube and being deflected from its reference position, and showing the finger fully inserted in the tube in retained engagement therewith and laterally deflected from its reference position respectively.

DESCRIPTION OF THE PREFERRED EMBODIMENT

Referring to the drawings, there is depicted an improved surface traversing apparatus or platform 10 in accordance with the invention. The platform 10 is depicted in FIG. 1 in operative positioning closely beneath the half of a horizontally extending tube sheet 14 located in one side of a nuclear steam generator 8.

Briefly, platform 10 is comprised of pair of interconnected slide assemblies 18 and 19, seen in FIGS. 3–7, which respectively mount four expandable fingers 11 and four expandable fingers 12. The fingers 11 and 12 are mounted for limited deflection relative to the slide assemblies 18 and 19 and are vertically oriented and sized for insertion into and withdrawal from circular openings 15 in the tube sheet 14, the openings 15 being defined by tubes 16 which extend downwardly through the tube sheet 14 and which are joined at their lower ends to the tube sheet, as by substantially circular weld beads 17 (seen in FIGS. 8A–C). Each finger 11, 12 is selectively expandable by a respective actuating cylinder 30 for gripping engagement with a respective tube 16 when inserted therewithin, the cylinders 30 for fingers 11 being interconnected for common actuation and the cylinders 30 for fingers 12 being interconnected independently of the finger 11 cylinders for common actuation.

The slide assemblies 18 and 19 are variably spaceable relative to one another in the vertical direction and are interconnected by a linear actuator, such as the vertically oriented double acting cylinder 21 and piston 20, for controllably varying the vertical spacing therebetween and accordingly varying the relative longitudinal or vertical positioning between fingers 11 en bloc and fingers 12 en bloc to selectively alternatively insert all of the fingers 11, 12 or only fingers 11, or only fingers 12 into respective openings 15.

The slide assemblies 18 and 19 comprise respective bases 22 and 23 and respective three-position self-centering actuators which comprise motors such as the slide cylinder assemblies 24 and 25 housed in bases 22 and 23 respectively. The fingers 11 and 12 and their respective actuating cylinders 30 are indirectly mounted by the slide cylinder assemblies 24 and 25 respectively. The slide cylinder assemblies 24 and 25 generally comprise cylinders 26 and 27 respectively housed in bores 42 and 43 in the bases 22 and 23 respectively, and pistons 28 and 29 operable in the cylinders 26 and 27 respectively. The cylinders 26 and 27 extend horizontally in orthogonal relationship to one another, and the fingers 11 and 12 are mounted for movement en bloc with the pistons 28 and 29 respectively to provide relative movement between fingers 11 and 12 laterally or transversely of their longitudinal extents in response to selective actuation of cylinder 26 or 27 for stepping the platform 10. The slide cylinder assemblies 24 and 25 are structured such that the respective pistons 28 and 29 each normally assume a precise neutral position and are reciprocably displaceable therefrom to each of two opposite extreme positions.

The platform 10 traverses the undersurface of the tube sheet 14 by releasing either the fingers 11 or the fingers 12 from gripping engagement with their respective tubes 16 while the other fingers remain in gripping engagement, withdrawing the released fingers downwardly out of the tubes, moving the withdrawn fingers transversely of both the tube sheet 14 and the fingers in gripping engagement therewith into substantial alignment with respective new tubes 16, and reinserting and expanding the moved fingers within the respective new tubes 16. In FIG. 1, platform 10 is depicted during execution of a step in which fingers 11 are inserted in tubes 16 and fingers 12 are withdrawn for stepping.

Referring now in greater detail to the platform 10 and to the inventive aspects thereof, the tubes 16 in the tube sheet 14 across which platform 10 moves are arranged such that the openings 15 are patterned in a uniform array of plural parallel rows extending orthogonally of plural parallel lines and represented by arrows $x$ and $y$ respectively in FIG. 2. Further, the openings 15 in any particular row or line are offset in the direction of a line or row respectively relative to the holes in the respective rows or lines on the immediately adjacent opposite sides thereof such as to have what is termed a "triangular pitch," with the center-to-center spacing between each adjacent pair of openings 15 being identical.

Figure 4:
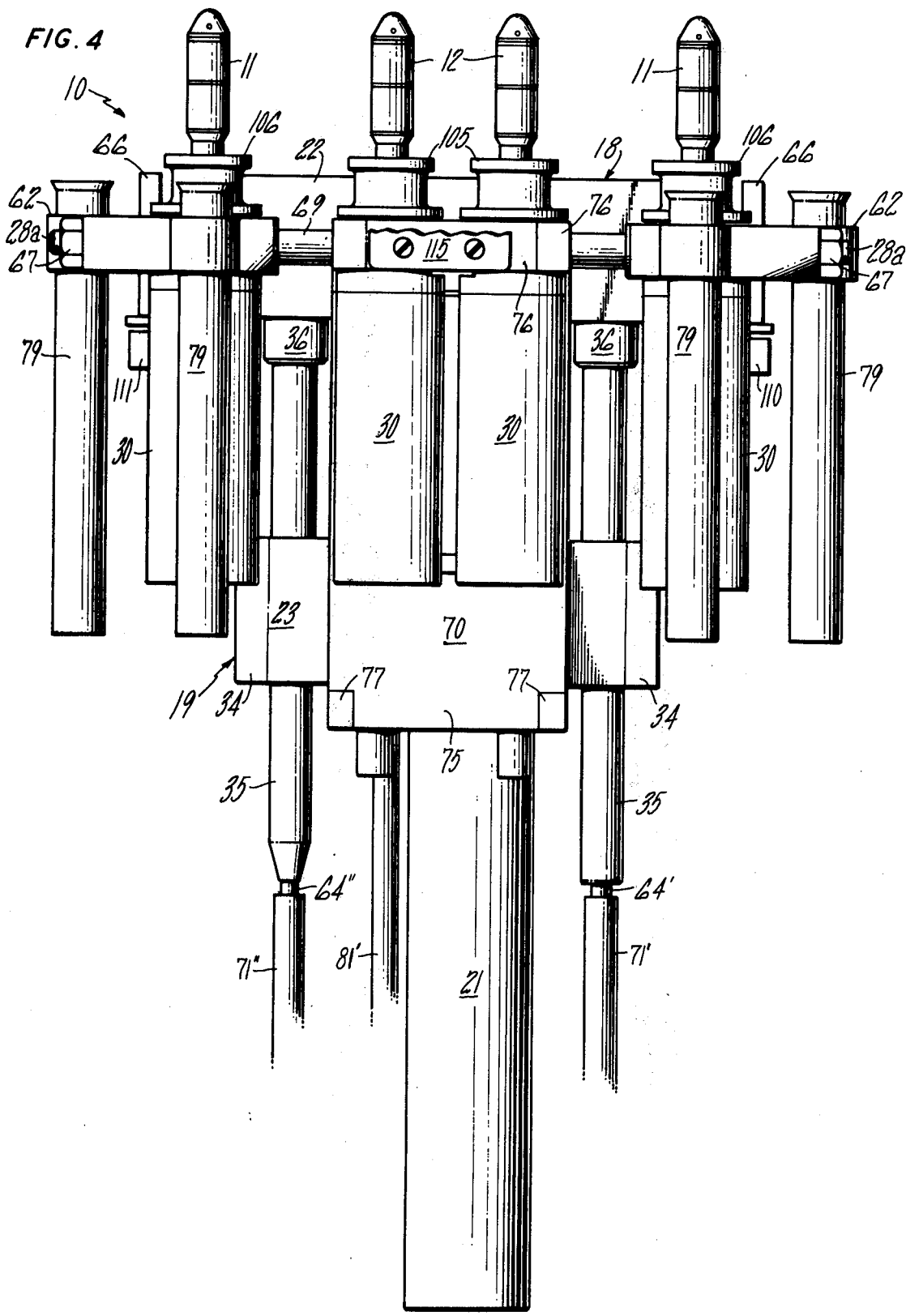
FIG. 4 is a front elevation view of the surface traversing apparatus.
Figure 5:
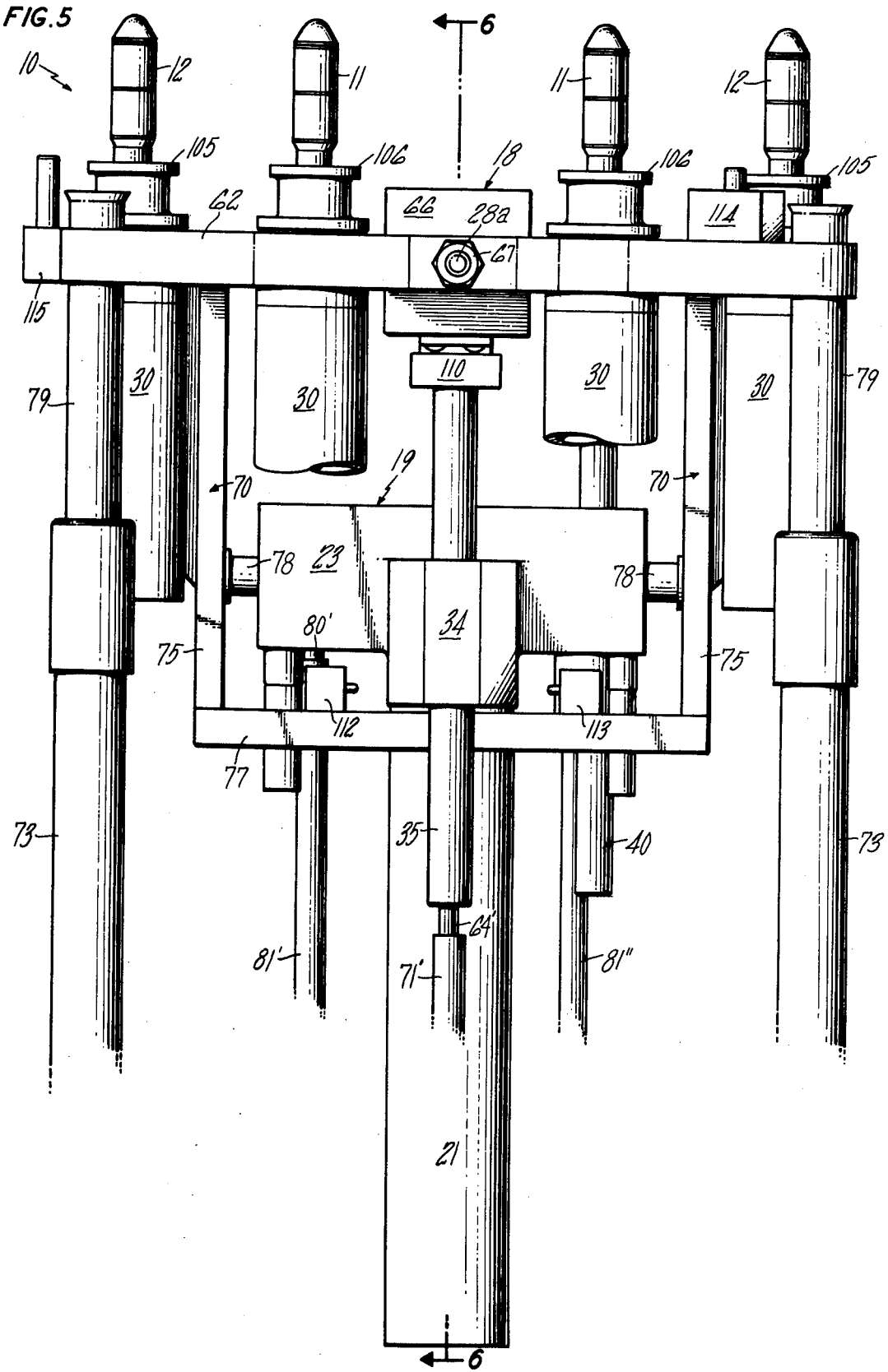
FIG. 5 is a right side elevation view of the surface traversing apparatus.
Figure 6:
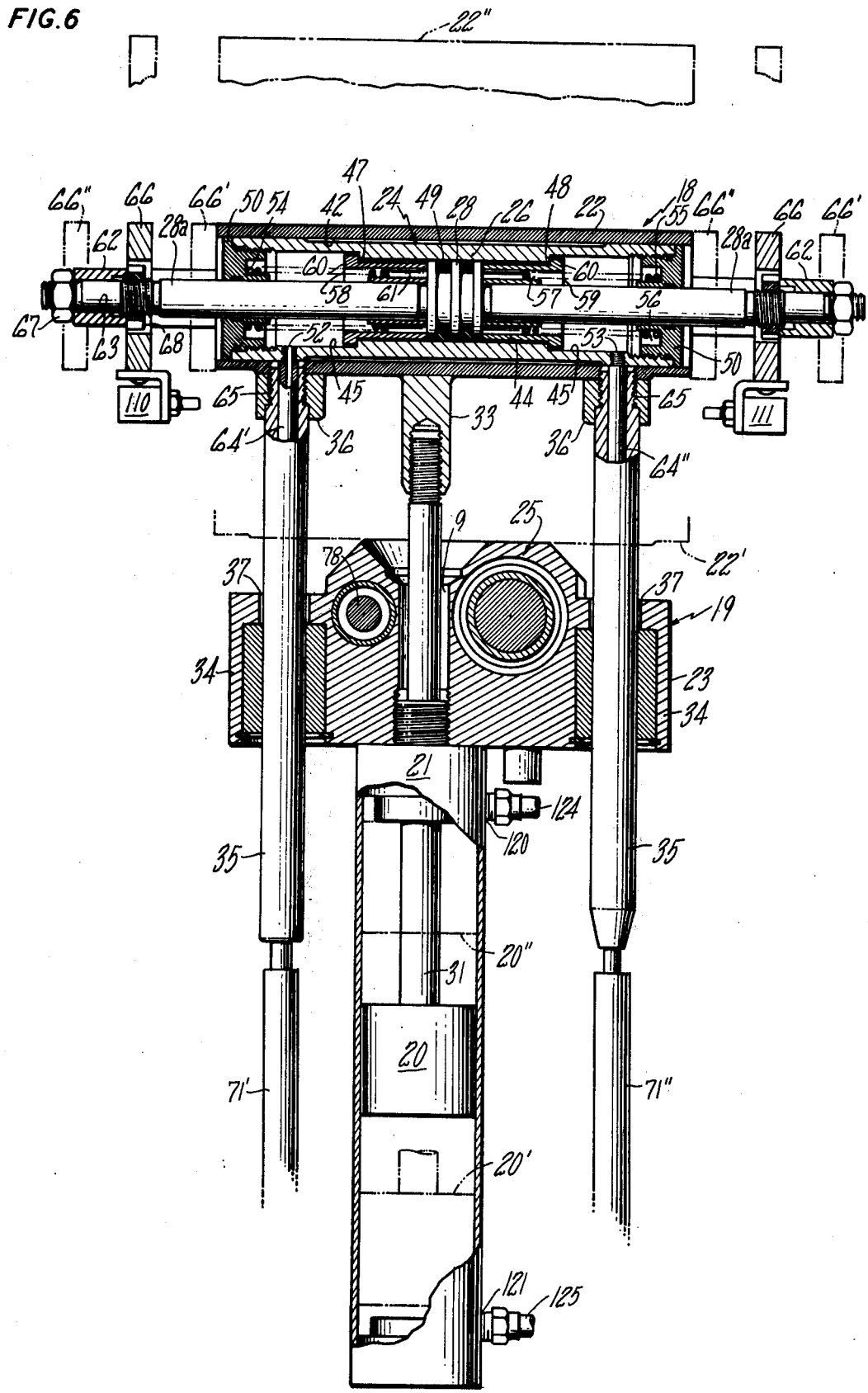
FIG. 6 is a sectional view of the surface traversing apparatus, with portions broken away, taken substantially along line 6—6 of FIG. 5.

As illustrated in FIGS. 4–7, and particularly FIG. 6, the base housing 22 of slide assembly 18 is positioned above the base housing 23 of slide assembly 19, the two bases 22 and 23 comprising a vertically separable compound base for platform 10. The actuating cylinder 21 is affixed at its upper end to the bottom of base housing 23 by threaded engagement therewith and depends therefrom. The piston 20, operative within cylinder 21, includes a piston rod 31 extending upwardly therefrom through a vertical bore 9 in base 23 and is affixed at its upper end to the bottom of base 22 by threaded engagement with a rigid mounting boss 33 depending from the base 22. A source of pressurized fluid, such as pressurized air source 74 located outside of steam generator 8, is selectively connected to upper and lower ports 120 and 121 respectively in the cylinder 21 through respective three-way valves 122 and 123 and respective air hoses 124 and 125, the air hoses extending between the valves and the cylinder ports. Each of the three-way valves 122 and 123 is selectively operative to alternatively connect the respective hose 124 or 125 to the fluid source or to connect the respective hose to an exhaust or vent port in the valve. The cylinder 21 in the illustrated embodiment is structured for a five-inch stroke length of piston 20, however, the length of piston rod 31 is such that the bases 22 and 23 contact one another, forming a hard stop, when the piston 20 is about one-quarter inch above its normal lower terminus. The diameter of bore 9 in base 23 is sufficient to clear the mounting projection 33 as the bases 22 and 23 move vertically into contact.

In FIG. 6, base 22 and piston 20 appear in solid lines at that positioning relative to base 23 and cylinder 21 respectively at which all of the fingers 11 and 12 are fully inserted into respective tubes 16. This corresponds with piston 20 being substantially centered in cylinder 21. When the fingers 11 connected to base 22 are to be withdrawn from the tube sheet 14, fluid is vented from cylinder 21 through the lower port 121 and fluid is admitted through the upper port 120 to allow the piston 20 and base 22 to move downwardly to the positions shown in phantom and numbered 20′ and 22′ respectively. Conversely, when fingers 12 connected to base 23 are to be withdrawn from tube sheet 14, fluid is admitted to the cylinder 21 through lower port 121 and is vented through the upper port 120 to allow the base 23 and cylinder 21 to move downwardly; however, this is depicted in FIG. 6 as relative upward movement of piston 20 and base 22 to the positions shown in phantom and numbered 20″ and 22″ respectively. The foregoing operations are reversed to insert fingers 11 or 12 which have been withdrawn. When all fingers 11, 12 have been fully inserted into gripping engagement with the tubes 16, the valves 122 and 123 isolate the cylinder 21 from air source 74.

Both bases 22 and 23 are of generally rectangular geometry in plan view with the longer dimension of each extending orthogonally of the other to accommodate the axial extents of the respective slide cylinders 24 and 25 therewithin, the axial extent of slide cylinder 24 extending parallel to the rows $x$ of holes 15 in tube sheet 14 in the illustrated embodiment. The lower base 23 additionally includes a pair of laterally extending support projections 34 on opposite sides thereof and the upper base 22 includes a laterally extending projection 39 on one side thereof. A pair of hollow rigid guide tubes 35 are fixed in fluid-sealed engagement at their upper ends with a respective pair of tubular bosses 36 on the bottom of base 22 near its opposite ends. The guide tubes are threaded into tapped bores 65 in the respective bosses 36. The guide tubes 35 extend downwardly through bearings in respective vertical guideways 37 in the lateral projections 34 of base 23 and are vertically reciprocable therewithin in close relationship therewith. Similarly, a rigid guide rod 40 is fixed at its upper end to the projection 39 on base 22 and extends downwardly through a bearing in another guideway 41 in the base 23, in close reciprocable relationship therewith. The guideways 37 and 41 cooperate with the guide tubes 35 and guide rod 40 respectively to laterally align and support base 23 relative to base 22.

Referring to the slide cylinder assemblies 24 and 25, both assemblies are essentially identical in internal design, the only exceptions being that the upper cylinder 26 is longer than the lower cylinder 27, the stroke length of piston 28 is longer than that of piston 29, and various components within cylinder 26 are correspondingly longer than their equivalents in cylinder 27. For this reason, only the upper cylinder assembly 24 illustrated in FIG. 6 will be depicted and described in detail. The cylinders 26 and 27 are secured in their respective bases 22 and 23 by several nylon-tipped self-locking set screws, not shown, which extend in threaded engagement through the respective bases into frictional engagement with the outer walls of the respective cylinders.

Cylinder assembly 24 is designed such that piston 28 is normally biased to a precise intermediate or centered neutral position within cylinder 26 and is axially displaceable from the neutral position to either of two extreme positions on opposite sides of the neutral position. The cylinder 26 is of one inner diameter along a mid-portion 44 having axial symmetry with the middle of the cylinder, and is of a greater diameter along each of the two axially outer portions 45, (45 immediately adjacent the axially opposite ends of mid-portion 44, thereby creating radial stop surfaces 47 and 48 respectively. The axial length of cylinder mid-portion 44 is preferably at least as long as the length of the piston 28 and its intended stroke length.

The piston 28 includes a pair of axially spaced sealing rings 49 seated thereon in fluid sealing engagement with the mid-portion 44 of the cylinder 26. A pair of piston rods $28_a$ are fixed to the piston 28, with a rod extending axially outwardly from each of the opposite ends of the piston. The piston rods $28_a$ extend through apertured cylinder end covers 50 which are threadedly secured to the opposite ends of the cylinder 24. The end covers 50 are in fluid sealed relationship with the cylinder 24 and provide a relatively slideable fluid seal about the piston rods $28_a$. A pair of tapped fluid ports 52, 53 extend radially through the cylinder 26 toward or near the opposite ends thereof respectively adjacent the axially inner sides of the two end covers 50 to provide fluid communication to each of the opposite ends of the piston 28, as in a double acting cylinder. The bosses 36 on base 22, and more specifically the bores 65 in the respective bosses, are in radial alignment with the respective tapped fluid ports 52, 53. The bores 65 extend through the base 22 for communication with ports 52, 53. Each one of a pair of hollow fluid tubes 64′ and 64″ is press fitted within a respective hollow guide tube 35 with its lower end extending below the guide tube 35 for connection to respective fluid hoses 71′ and 71″. The upper ends of the fluid tubes 64′ and 64″ extend beyond the upper ends of the respective guide tubes 35 and are threaded for fluid sealing threaded engagement with respective ports 52, 53 when the guide tubes 35 are threaded into bores 65 in bosses 36.

The piston 28 is biased toward a precise neutral position, shown in solid lines in FIG. 6, by a pair of cylindrical coil springs 54 and 55 acting axially in compression on the axially opposite ends of the piston 28. The axially outer ends of the springs 54 and 55 are seated in respective axially recessed annular grooves 56 in the respective cylinder end covers 50. The springs 54 and 55 act axially inwardly on opposite sides of the piston 28 to urge the piston to some position at which the opposed biasing forces balance, or stated another way, the net biasing force is zero. However, it is practically impossible to have two springs which would have constant relative spring rates over the life of their use, and as the spring rate relationship changed the position of the piston 28 at which the opposing spring forces would balance would also change. Therefore, in order to insure a constant neutral position of piston 28 within cylinder 26, the net biasing force applied to piston 28 by springs 54 and 55 is removed or cancelled at one, and substantially only one, precise axial positioning thereof. This is accomplished by stopping the inward axial travel of springs 54, 55 at precise positions through their engagement with the respective stop surfaces 47, 48.

The axially inner ends of springs 54 and 55 are seated in respective axially recessed annular grooves 57 in respective cylindrical adaptor members 58 and 59. The adaptor members 58 and 59 encircle the respective piston rods $28_a$ adjacent the opposite ends of the piston 28 and are slideable relative to the cylinder 26 and the piston rods $28_a$. The adaptor members 58 and 59, which are preferably identical in size and shape, each include a forward or axially inner section having an outer diameter slightly less than the inner diameter of cylinder mid-section 44, and a rearward or axially outer section which extends radially outwardly of the forward section to form a flange or stop dog 60 which radially overlaps the respective stop surface 47 or 48. The forward end of each adaptor 58, 59 is positioned to contact a respective end of the piston 28 and the sum of the axial length of piston 28 and the lengths of the forward sections of both adaptors 58, 59 (from stop dogs 60) is selected to equal the axial spacing between stop surfaces 47, 48 to within 0.005 inch. Stated another way, when a balanced fluid pressure exists on opposite sides of piston 28, such as either no pressure or equal overpressures at both of ports 52, 53, the piston 28 will be spring biased to a neutral position which remains accurate or constant to within ±0.0025 inch. At the neutral position, the net spring biasing force is essentially zero.

The adaptors 58, 59 each include four vent holes 61 extending axially from the annular groove 57 to the inner or forward end of the adaptor to provide direct fluid communication between the fluid ports 52, 53 and the respective ends of piston 28 for actuation of the piston when an increased fluid pressure appears at a fluid port.

Two finger mounting plates 62 are fixed to the axially outer ends of the respective opposite piston rods $28_a$ of cylinder assembly 24. Each plate 62 is in the general shape of a horizontal arm extending transversely of the axis of cylinder 26. A hard contact plate 66 fixed to the inner side of each mounting plate 62 is positioned to contact and stop against the respective adjacent end of the base 22 when the piston 28 is reciprocated a certain distance toward the remote end of the cylinder 26 from the neutral position to establish the limit of travel of piston 28 in that direction. The outer end of each piston rod $28_a$ extends through a mounting bore 63 in the respective mounting plate 62 and contact plate 66, and nuts 67 and 68 are threaded to the rod respectively outside plate 62 and inside contact plate 66 in engagement therewith to position the plate axially of the rod. The bore 63 through which each piston rod $28_a$ extends is counterbored to receive nut 68 fully therewithin, thereby insuring that the larger surface area of contact plate 66 provides the stop contact with the end of base 22. A rigid spacer and guide rod 69 extends parallel to piston rods $28_a$ and is fixed at its opposite ends to the two mounting plates 62 by suitable fasteners for maintaining alignment between the mounting plates and the base 22. The guide rod 69 is reciprocably supported by a bearing housed in base 22.

In the illustrated embodiment, the mountng plates 62 are positioned on their respective piston rods $28_a$ such that the stroke length of piston 28 from its neutral position in cylinder 26 to either of the opposite extremes or outer limits is equal, that length being the center-to-center distance between two immediately adjacent lines $y$ of openings 15. These stroke lengths are less than that required for the piston 28 to contact the cylinder end covers 50 so as to preserve the integrity of end covers 50, though it will be appreciated that if the fluid pressures are not great, the length of cylinder 26 might be selected such that the end covers 50 provide the stroke limits.

The lower cylinder assembly 25, which is essentially the same in internal design as upper cylinder assembly 24, includes a pair of piston rods $29_a$ respectively extending beyond the ends of base 23 from the opposite ends of piston 29. Each piston rod $29_a$ is rigidly fixed to a respective one of two bracket assemblies 70 which in turn each mount two fingers 12. Each bracket assembly 70 includes a vertically extending, rectangular bracket plate 75 fixed to the axially outer end of a respective piston rod $29_a$ by conventional fastening means, such as a nut or screw, and a horizontal finger mounting plate 76 secured to the bracket plate near its upper end, as by welding. The bracket plates 75 each extend transversely of their respective piston rods $29_a$ to present a large surface area for contacting the adjacent end of base 23 thereby to establish the limits of travel for piston 29 in the same manner as do the contact plates 66 for piston 28. The positioning of bracket plates 75 on their respective piston rods $29_a$ is such that the stroke length of piston 29 in cylinder 27 is the same in both directions from the neutral position and is equal to the center-to-center spacing between two immediately adjacent rows $x$ of openings 15.

Two rigid reinforcing straps 77 extend between and are fastened to the respective lower corners of the opposed bracket plates 75 to laterally support the bracket plates. Additionally, a rigid spacer and guide rod 78, similar to guide rod 69, extends parallel to piston rods $29_a$ and is fixed at its opposite ends to the two bracket plates 75 by suitable fasteners for maintaining alignment between the bracket plates and the base 23. The guide rod 78 is reciprocably supported by a bearing housed in base 23.

The finger mounting plates 76 are the same thickness as plates 62 and extend outwardly from the bracket plates 75 at the same vertical position or elevation as plates 62 when the piston 20 is axially centered in vertical cylinder 21. Each mounting plate 76 is relatively compact for mounting two closely spaced fingers 12 and associated actuating cylinders 30, whereas each mounting plate 62 is elongated for a somewhat wider spacing of its fingers 11 and for mounting a pair of spaced probe tubes 79 at its opposite extremities. The probe tubes 79 may receive eddy current probes or the like from outside of steam generator 8 through conduits 73. In fact, one end of each mounting plate 62 has a dog leg bend outwardly from the bases 22, 23 such that the probe tube 79 near the end of the dog leg has access to various of the openings 15 located in remote corner regions of the tube sheet 14.

A pair of rigid fluid tubes 80' and 80'', similar to but shorter than fluid tubes 64' and 64'', extend upwardly through the base 23 radially of bore 43 and into threaded engagement with a respective pair of ports (not shown) near the opposite ends of the cylinder 27. Fluid hoses 81' and 81'' are connected to the fluid tubes 80' and 80'' respectively for conveying fluid to or from the respective ends of cylinder 27 to position the piston 29.

The fluid hoses 71' and 71'' for cylinder 26 are connected to air source 74 through three-way valves 82' and 82'' respectively. Similarly, the fluid hoses 81' and 81'' for cylinder 27 are also connected to the air source 74 through three-way valves 83' and 83'' respectively. Each of the three-way valves 82', 82'', 83' and 83'' is selectively operative to alternatively connect the respective fluid hose 71', 71'', 81' or 81'' to the fluid source or to connect the respective fluid hose to an exhaust or vent port in the valve.

When hose 71' is connected to the fluid source and the hose 71'' is vented, the piston 28 is actuated to its stop-limited extreme position in cylinder 26 in which the contact plates 66 assume the position shown in phantom as 66' in FIG. 6; when hose 71'' is connected to the fluid source and the hose 71' is vented, the piston 28 is actuated to the opposite stop-limited extreme position in which contact plates 66 assume the position shown in phantom 66''; and when both hoses 71' and 71'' are disconnected from the fluid source and vented, the piston 28 and the contact plates 66 return to their neutral positions shown in solid lines in FIG. 6. Piston 29 operates in cylinder 27 in the same manner as piston 28 in cylinder 26. Accordingly, fingers 11 and fingers 12 are moved respectively en bloc transversely or laterally of the platform bases 22 and 23.

Referring now to fingers 11, 12 and their respective actuating cylinders 30, two fingers 11 are mounted on each mounting plate 62 and two fingers 12 are mounted on each mounting plate 76. The lateral spacing between each finger 11 or 12 on a mounting plate 62 or 76, and the lateral spacing between a pair of fingers 11 or 12 on one mounting plate and a respective pair of fingers 11 or 12 on the other respective mounting plate are held to a minimum to insure passage of the carriage 10 through a manway 72 in steam generator 8. The minimum lateral spacing between fingers 11, 12 is generally dictated by the size and geometry of bases 22, 23, which is also kept to a minimum. The positioning of each finger 11 or 12 on its respective plate 62 or 76 is established such that each finger 11 or 12 has a counterpart on the diametrically substantially opposite side of cylinder 21 to provide support for the platform 10 in vertical planes which pass through or near the center of cylinder 21 and thus also through or near the center of gravity of the platform 10 for stability. The four probe tubes 79 are all located at the outer bounds of lateral movement of the fingers 11, 12, though they might be positioned outwardly further if space limitations permit. All of the fingers 11, 12 are of identical structure and are mounted to their respective mounting plates 62, 76 in an identical manner which permits some lateral deflection of the finger relative to its mounting plate to permit or facilitate the insertion of the respective finger into an opening 15 with which it might be slightly misaligned as a result of eccentricities in weld bead 17, accumulated tolerances in the spacing of tubes 16 and/or accumulated tolerances in the mechanisms of platform 10. Accordingly, only the structure and mounting arrangement for one finger 12 will be described in detail.

The finger 12, as illustrated in FIGS. 8A–8C, comprises a pair of cylindrical elastomer expanders 85 concentrically mounted in radially close fitting engagement about a reduced diameter section of a piston rod 86 which extends upwardly from the actuating cylinder 30. The pair of expanders 85 are axially separated by a washer 87 which encircles piston rod 86.

A bullet-nose end cap 88 is threaded and locked to the axially outer or upper end of the piston rod 86 with its base in downwardly facing retaining engagement with the upper end of the uppermost of the pair of expanders 85. A rigid, generally cylindrical mounting adaptor 90, to be more fully described hereinafter, is fixed to the cylinder 30 and axially engages the lower end of the lowermost of the pair of expanders 85 in upwardly facing retaining relationship therewith. The actuating cylinder 30 is of a conventional double acting type and houses a piston 91 from which piston rod 86 extends. The spacing between end cap 88 and mounting adaptor 90 axially of the expanders 85 is such that the expanders 85 are in constant axial engagement with end cap 88 and adaptor 90, with the piston 91 being normally drawn to, or nearly to, its uppermost limit in the cylinder 30.

Introduction of pressurized fluid to the upper fluid port (not shown) in cylinder 30 is operative to drive piston 91 relatively downwardly, thereby axially compressing the expanders 85 and effecting a corresponding radial expansion thereof. The normal or relaxed diameter of the expanders 85 of finger 12 is such as to provide sufficient radial clearance between the finger 12 and the inner wall of a tube 16 to facilitate their relative insertion and withdrawal, while requiring relatively little downward displacement of piston 91 to expand the expanders 85 into tight frictional engagement with the inner wall of a tube 16 for supporting a portion of the weight of platform 10. An air pressure of 60–100 psi is suitable for obtaining the requisite displacement of piston 91. Air is vented from above piston 91 and pressurized air may be introduced to the lower fluid port (not shown) in cylinder 30 to return the expanders 85 to the relaxed or contracted state. The four cylinders 30 associated with fingers 11 are connected for actuation en bloc, and the four cylinders 30 associated with fingers 12 are connected for actuation en bloc independently of the finger 11 cylinders.

A finger 12 and its actuating cylinder 30 are mounted on the platform 10 by a mounting assembly 89 which is resiliently supported by the mounting plate 76. The mounting assembly 89 includes the mounting adaptor 90 which extends through a vertical mounting bore 92 in plate 76; a rigid annular spacer 93 which encircles the adaptor 90 below plate 76; and three resilient annular mounting members such as resilient rubber O-rings 94, 95 and 96 or the like, interposed between the plate 76 and either the adaptor 90 or the spacer 93.

The mounting adaptor 90 is of generally cylindrical geometry and has upper and lower sections 97 and 98 respectively. The adaptor lower section 98 is internally threaded near its lower end and concentrically encircles and threadedly engages an externally threaded end extension 99 extending coaxially upwardly from the actuating cylinder 30. The cylinder end extension 99 is of smaller outside diameter than the main body of cylinder 30, and the lower end of adaptor 90 axially abuts the upwardly facing annular shoulder 100 formed at the junction of extension 99 with the cylinder 30 proper. The adaptor lower section 98 extends upwardly from cylinder 30 through bore 92 in plate 76 with a diametral clearance therebetween which permits movement of the adaptor 90 both laterally and angularly or pivotally relative to the plate 76. In the illustrated embodiment, this diametral clearance is about 0.050 inch, and the thickness of plate 76 around bore 92 is such that the adaptor 90 and attached finger 12 and cylinder 30 are capable of universally pivoting or angularly deflection 3° or 4° relative to the axis of bore 92, an angle of about 2° being illustrated in FIG. 8B.

The resilient O-ring 94 is seated in an annular radial groove 101 in the outer surface of the adaptor lower section 98 for radially oppositely engaging the adaptor 90 and the plate 76 within the bore 92 to resiliently center the adaptor in the bore. The O-ring 94 is positioned midway between the top and bottom of bore 92 to pivot the adaptor 90 and finger 12 thereat if a moment of force is applied to finger 12 near its upper end.

A flange 102 extends radially outwardly from the adaptor lower section 98 over the plate 76 and includes an annular axial groove 103 in the undersurface thereof overlying the plate 76. The spacer 93 concentrically closely encircles the adaptor lower portion 98 in axial abutment with the annular shoulder 100 on cylinder 30 and includes an annular axial groove 104 in the upper surface thereof which radially underlies the plate 76. The axial spacing between the spacer 93 and the adaptor flange 102 is greater than the vertical thickness of plate 76 to permit the pivotal deflection of the finger 12 earlier described. The resilient O-rings 95 and 96 are seated in grooves 103 and 104 respectively in opposing axial engagement with the upper and lower surfaces respectively of plate 76 and cooperate with the resilient O-ring 94 to normally maintain the adaptor 90 centered coaxially within bore 92, as illustrated in FIG. 8A. By having flange 102 as an integral part of adaptor 90, the spacing between flange 102 and spacer 93 is easily established and repeatedly maintained by threading the adaptor 90 into abutting engagement with adaptor shoulder 100.

The adaptor upper section 107 is of smaller internal and external diameters than the adaptor lower section 98, its internal diameter being sized to provide lateral support to the reduced diameter section of piston rod 86 in sliding relationship therewith and its external diameter being substantially the same as that of the expanders 85 in their relaxed state for insertion into a tube 16. A rigid stop flange 105 extends radially outwardly from the adaptor 90 at the base of the adaptor upper section 97 for engagement with the underside of tube sheet 14 to limit the extent of insertion of finger 12 into a tube 16. The extent of insertion of fingers 11 in respective tubes 16 is similarly limited by corresponding stop flanges 106 respectively associated therewith, the full insertion of both the fingers 11 and 12 corresponding with a centered positioning of piston 20 in cylinder 21. It will be appreciated that the length of fingers 11, 12 above the respective stop fingers 106, 105 is less than the 2¼ inch maximum stroke length of piston 20 downwardly from its centered position in cylinder 21. It will be further appreciated that downward slippage of one or both groups of fingers 11 and 12 relative to tubes 16 is compensated for by fully inserting each set of fingers to their respective stop flanges during each step of those fingers. In this way, any such slippage does not accumulate from step to step, but rather each successive stepping action of a set of fingers 12 or 13 is effective to recover any slippage of that set of fingers occurring since its previous step.

Briefly, FIG. 8A shows a finger 12 normally centered on its plate 76 prior to insertion into a tube 16 with which it is substantially, but not exactly, aligned. The FIG. 8B shows finger 12 as it enters tube 16 and is deflected or pivoted rightwardly by engagement with the left side of the weld bead 17 and the tube. The FIG. 8C shows the finger 12 fully inserted in and expanded into retained engagement with the tube 16, the finger 12 and adaptor 90 having been laterally displaced rightwardly of their normally coaxial alignment with bore 92 and into contact with the plate 76 at the right side of bore 92.

Referring to the operation of platform 10, air to and from each of the various actuating cylinders is controlled by solenoid actuated valves (only valves 82', 82", 83' and 83" being shown herein) which are computer controlled. Electrical signals indicating the positions of the various movable elements of platform 10 are provided by microswitches 110–115 respectively, the signals being connected (by conductors, not shown) as inputs to a control computer. Microswitches 110 and 111 are respectively fixed to the two mounting plates 62 and are positioned such that they are actuated by contact with bosses 36 at the two extreme positions of slide piston 28 respectively. Similarly, microswitches 112 and 113 are respectively fixed to one of the reinforcing straps 77 which moves with bracket plates 75 and are positioned such that they are actuated by contact with a support projection 34 at the two extreme positions of slide piston 29 respectively. The microswitches 114 and 115 are each fixed to a mounting plate 62 and 76 respectively and are positioned such that they are actuated when the fingers 11 and fingers 12 respectively are nearly fully inserted into respective tubes 16. Additional microswitches, not shown, may be positioned on platform 10 for actuation when the bases 22 and 23 are either in contact with one another or are at their maximum spacing relative to one another.

Through selective computer control of the respective solenoid actuated valves associated with the respective air cylinders 21, 26, 27 and 30, the fingers 11 and 12 are moved en bloc relatively vertically and laterally for traversing the tube sheet 14. The lateral or transverse relative movement between fingers 11 and fingers 12 occurs through lateral or transverse movement of fingers 11 or fingers 12, or both, relative to the combined bases 22 and 23; whereas the relative vertical or longitudinal movement between fingers 11 and fingers 12 occurs through movement of one group of fingers 11 or 12 and their respective base 22 or 23 vertically relative to the respectively opposite base 23 or 22.

To step platform 10 across the tube sheet 14, the expanders 85 either of fingers 11 or fingers 12 are relaxed and the respective base 22 or 23 is moved downwardly relative to the other base and the tube sheet to clear the respective fingers from the tube sheet, the fingers 11 and 12 so cleared from the tube sheet are then moved en bloc transversely of the other fingers 12 or 11 and the tube sheet into substantial alignment with respective "new" tubes 16 by actuation of a selected one or the other, or both, of the slide cylinder assemblies 24 and 25, the respective base 22 or 23 of the fingers 11 or 12 so moved is then moved upwardly relative to the other base and the tube sheet to insert the fingers in the respective "new" tubes, and the expanders 85 of the newly inserted fingers are expanded into gripping engagement with the "new" tubes.

If either one of the slide cylinder assemblies 24 or 25 is at one of its two outer extreme positions at the initiation of a step, movement of the particular slide assembly to its opposite extreme is effective to move that set of fingers 11 or 12 which is clear of tube sheet 14 from alignment with openings 15 in one line or row of tubes 16 to "new" openings two lines or two rows away respectively. On the other hand, if both slide cylinder assemblies 24 and 25 are in their neutral or centered positions at the initiation of a step, both slide cylinder assemblies will be actuated to appropriate extreme positions such that the set of fingers 11 or 12 which is clear of tube sheet 14 is moved from alignment with openings 15 in one line and row to "new " openings one line and one row away. This latter move may be termed a "diagonal" move as it includes both an $x$ component and a $y$ component, and makes it possible for the platform 10 to position the probe tubes 79 in alignment with virtually every tube 16 on tube sheet 14.

As will be apparent to persons skilled in the art, various modifications, adaptations and variations of the foregoing specific disclosure can be made without departing from the teachings of the present invention.

The embodiments of the invention in which an exclusive property or privilege is claimed are defined as follows:

1. In a surface traversing apparatus adapted to be supported near a member, the member having an ordered array of laterally spaced openings extending longitudinally thereinto from its surface, the surface traversing apparatus including base means, first and second finger means each sized for relatively close fitting insertion into the member openings, means connecting the respective first and second finger means to the base means to extend longitudinally toward the member, the first and second finger means each being mounted for longitudinal reciprocation toward and away from the member for insertion into and withdrawal from the openings therein respectively, the insertion of a finger means into an opening in the member serving to restrict relative lateral motion therebetween, said first finger means being movable transversely of the base means and said second finger means, drive means operatively connected to the base means and to the first finger means to move the first finger means transversely of the base means and the second finger means from one member opening into near alignment with another member opening, means for selectively alternately inserting the first or second finger means while the other of said finger means is withdrawn so as to transport the first finger means transversely of the base means and the second finger means by said drive means to move the first and second finger means to new relative positions, the improvement wherein the means for connecting the first and second finger means to the base means comprise means interposed in operative engagement between the base means and at least one of the first and second finger means for flexibly mounting said at least one of the first and second finger means for limited lateral deflection relative to the other of the finger means by engagement with a sidewall member of a said member opening thereby to facilitate insertion of said first and second finger means into respective openings in the member.

2. In a surface traversing apparatus adapted to be supported near a member, the member having an ordered array of laterally spaced longitudinally extending openings in its surface, the surface traversing apparatus including base means, first and second finger means each sized for relatively close fitting insertion into the member openings, means for connecting the respective first and second finger means to the base means to extend longitudinally toward the member, the first and second finger means each being mounted for longitudinal reciprocation toward and away from the member for extension into and withdrawal from the openings therein respectively, the insertion of a finger means into an opening in the member serving to restrict relative lateral motion therebetween, the first and second finger means each being movable transversely relative to the base means and one another, first and second selectively operable drive means operatively connected to the first and second finger means respectively and to the base means to move the first and second finger means respectively transversely relative to one another for movement from one member opening into near alignment with another member opening, means for selectively alternately extending the first or second finger means while the other of said finger means is withdrawn so as to transport the first or second finger means transversely relative to the other of the finger means and the base means to move the first and second finger means to new relative positions, the improvement wherein the means for connecting the first and second finger means to the base means comprise mounting means interposed in operative engagement between the base means and at least one of the first and second finger means for flexibly mounting said at least one of the first and second finger means for limited lateral deflection relative to the other of the finger means by engagement with a sidewall surface of a said member opening thereby to exactly align said first and second finger means with respective openings in the member to facilitate their insertion thereinto.

3. The surface traversing apparatus of claim 2 wherein said mounting means are resiliently flexible for establishing a normal reference position of said at least one of said first and second finger means, said at least one finger means being resiliently laterally deflectable from said reference position by said engagement with the sidewall of a said member opening.

4. The surface traversing apparatus of claim 3 wherein said openings in said member are of substantially circular cross section and each said first and second finger means is selectively radially expansible into retained engagement with the sidewall surface of a said opening into which inserted, thereby to supportingly connect the surface traversing apparatus to the member.

5. The surface traversing apparatus of claim 3 including a rigid support element connected to the base means and having a cylindrical opening therein oriented axially substantially parallel to said longitudinal opening in said member, said at least one finger means being disposed in radially spaced coaxial relationship with the wall of said cylindrical opening in said support element, and said mounting means includes annular resilient means intermediate and radially oppositely engaging the wall of the cylindrical opening in said rigid support element and said at least one finger means thereby to allow resilient pivotal and translatory deflection of said at least one finger means transversely of said support element.

6. The surface traversing apparatus of claim 5 wherein said finger means includes a cylindrical adaptor, said adaptor being radially spaced from said support element within said cylindrical opening, and said annular resilient means being positioned in said cylindrical opening in said support element radially intermediate said adaptor and said support element in radially opposite mutual engagement therewith.

7. The surface traversing apparatus of claim 6 wherein said support element includes radial shoulders adjacent the opposite ends of said cylinder opening therein and said cylindrical adaptor further includes a pair of axially spaced fingers, said annular resilient means comprises a first resilient ring, and second and third resilient rings, said flanges being in fixed axial relationship on said adaptor and extending radially outwardly in spaced axially opposed relationship with said support element shoulders, and said second and third resilient rings being positioned in the respective spaces between said shoulders and the respectively opposing pair of flanges in axially opposite mutual engagement therewith thereby to resiliently support said finger means longitudinally of said rigid support element and, in combination with said first resilient ring, to resiliently align said finger means concentrically with said cylindrical opening in said support element.

8. In a surface traversing apparatus adapted to be supported near a member for traversing the surface of the member in discrete steps, the member having an ordered array of laterally spaced parallel cylindrical openings extending threreinto from the surface thereof, said array of openings comprising a plurality of parallel lines of said holes and a plurality of parallel rows of said holes extending at an angle to said lines of holes, the surface traversing apparatus including base means, multiple first finger means and multiple second finger means, each said first and second finger means being respectively sized for relatively close fitting longitudinal insertion into respective member openings and selectively radially expansible into retained engagement with the sidewall surface of an opening into which inserted for supporting the surface traversing apparatus near the member, first and second connecting means respectively connecting the plural first finger means en bloc and the plural second finger means en bloc to the base means for respective stepwise lateral motion relative to the base means in different respective directions, first and second drive means operatively connected to the plural first and plural second finger means respectively and to the base means to move the plural first and plural second finger means respectively en bloc laterally relative to the base means and to one another in steps, the lengths of said steps for said first and second finger means corresponding substantially with an integer multiple of the center-to-center spacing between adjacent said rows of holes and adjacent said lines of holes respectively, the plural first and plural second finger means being mounted for respective en bloc longitudinal reciprocation toward and away from the member for extension into and withdrawal from the openings therein respectively, means to selectively alternately extend the plural first finger means en bloc or the plural second finger means en bloc while the other of said finger means are withdrawn so as to alternately transport the first or second finger means en bloc laterally relative to the other of the finger means and the base by the first or second drive means to move the first and second finger means en bloc to new relative positions, the improvement wherein the first and second means for connecting the plural first and second finger means to the base means comprise respective first and second rigid support elements connected to the base means for lateral movement by the respective first and second drive means, and resiliently flexible mounting means in operative engagement between each individual said first and second finger means and the respective said support element for allowing resilient lateral deflection of each said finger means relative to the other said finger means, a said finger means being laterally deflected by engagement with a sidewall surface of a said member opening to facilitate insertion of said first and second finger means into respective member openings.

9. The surface traversing apparatus of claim 8 wherein said first and second support elements respectively include a plurality of cylindrical openings therein oriented to extend longitudinally parallel to the openings in the member, each of said plural first and second finger means is disposed in coaxial relation with a respective said support element opening, and said finger means including an individual rigid cylindrical mounting adaptor and said mounting means comprises a resilient ring for each said finger means, each said adaptor being radially spaced from a respective support element within a respective cylindrical opening in the support element, and each said resilient ring being positioned within the respective said support element opening intermediate said support element and said adaptor in mutual opposing radial engagement therewith thereby to center said finger means for resilient pivotal and lateral translatory deflection thereof relative to the respective support element.

10. The surface traversing apparatus of claim 9 wherein each said finger means includes radially deformable cylinder means sized for insertion in a respective member opening and an actuator for radially deforming the cylinder means, said actuator comprising a housing and rod means, said rod means extending reciprocably from the housing, said actuator housing being connected in fixed engagement with the adaptor, said rod means extending concentrically through the deformable cylinder means in axial sliding relationship therewith, and said rod means and said adaptor respectively oppositely axially engaging said deformable cylinder means at its axially outer and inner ends respectively whereby actuation of the rod means toward the actuator housing axially compresses and radially expands the deformable cylinder into gripping engagement with a surrounding member opening.

11. The surface traversing apparatus of claim 10 wherein said first and second support elements each include radial shoulders respectively adjacent the axially inner and outer opposite ends of each said cylindrical opening therein, each said adaptor extends axially through its respective said opening in said support element and beyond the inner and outer shoulders and includes a flange fixed thereto and extending radially outwardly therefrom in axially spaced facing ralationship with said respective outer shoulder, said actuator housing defines a support surface extending radially outwardly of the adaptor in axially spaced facing relationship with the inner shoulder of the respective said opening in the support element, a second resilient annular ring is positioned intermediate said adaptor flange and said outer radial shoulder in mutual axially opposing engagement therewith, and a third resilient annular ring is positioned intermediate said actuator-defined support surface and said inner shoulder in mutual axially opposing engagement therewith thereby to resiliently longitudinally support said finger means.

12. The surface traversing apparatus of claim 11 wherein said adaptor is fixed to said actuator housing in axially abutting relationship therewith thereby to accurately establish the axial spacing between said actuator-defined support surface and said actuator adaptor.

13. The surface traversing apparatus of claim 11 wherein each said adaptor includes a radially extending stop surface axially outwardly of the respective said support element, said stop surface extending radially beyond the diameter of a respective member opening thereby to limit the extent to which the respective said deformable cylinder is inserted thereinto.

* * * * *

UNITED STATES PATENT OFFICE
CERTIFICATE OF CORRECTION

PATENT NO. : 4,018,346
DATED : April 19, 1977
INVENTOR(S) : Adam Leshem, Martin Lewis Marugg, and Dennis Edward Savor It is certified that error appears in the above-identified patent and that said Letters Patent are hereby corrected as shown below:

Column 10, line 50 delete "deflection" substitute --deflecting--.

Column 11, line 14 delete "107" substitute --97--.

Column 12, line 10 delete "bepositioned" substitute --be positioned--.

Column 14, line 56 delete "fingers" and substitute --flanges--.

Column 16, line 40 delete "ralation-" substitute --relation---.

Signed and Sealed this

Twenty-sixth Day of September 1978

[SEAL]

Attest:

RUTH C. MASON
Attesting Officer

DONALD W. BANNER
Commissioner of Patents and Trademarks